(12) United States Patent
Chugtu et al.

(10) Patent No.: US 11,005,973 B2
(45) Date of Patent: *May 11, 2021

(54) AUTOMATIC BOOTSTRAPPING AND DYNAMIC CONFIGURATION OF DATA CENTER NODES

(71) Applicant: Verizon Patent and Licensing Inc., Arlington, VA (US)

(72) Inventors: Manish Chugtu, Bedford, MA (US); Sivaram Subramaniyan Kannan, Woburn, MA (US); Vishant Singh, Burlington, MA (US); Jitendra Kumar Yadav, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,662

(22) Filed: Dec. 3, 2019

(65) Prior Publication Data

US 2020/0106862 A1 Apr. 2, 2020

Related U.S. Application Data

(63) Continuation of application No. 15/462,173, filed on Mar. 17, 2017, now Pat. No. 10,516,760.

(51) Int. Cl.
| | |
|---|---|
| *G06F 15/16* | (2006.01) |
| *H04L 29/08* | (2006.01) |
| *H04L 29/12* | (2006.01) |
| *H04L 12/24* | (2006.01) |
| *G06F 9/4401* | (2018.01) |
| *G06F 15/173* | (2006.01) |

(52) U.S. Cl.
CPC ............ *H04L 67/34* (2013.01); *G06F 9/4406* (2013.01); *G06F 9/4416* (2013.01); *H04L 41/0806* (2013.01); *H04L 41/0886* (2013.01); *H04L 61/2015* (2013.01); *H04L 67/10* (2013.01)

(58) Field of Classification Search
CPC . H04L 67/34; H04L 41/0886; H04L 41/0806; H04L 61/2015; H04L 67/10; G06F 9/4416; G06F 9/4406
USPC ................................................. 709/217, 224
See application file for complete search history.

(56) References Cited

U.S. PATENT DOCUMENTS

| | | | |
|---|---|---|---|
| 2004/0267716 A1* | 12/2004 | Prabu | ........................ G06F 8/61 |
| 2005/0180326 A1 | 8/2005 | Goldflam | |
| 2005/0198629 A1* | 9/2005 | Vishwanath | .............. G06F 8/61 |
| | | | 717/174 |

(Continued)

*Primary Examiner* — Karen C Tang

(57) ABSTRACT

A device can receive, from a node of a set of nodes, a dynamic host configuration protocol (DHCP) discovery request. The device can determine a DHCP offer based on metadata associated with the node. The device can transmit, to the node, pre-boot execution environment (PXE) instructions, which can cause the node to load a minimal operating system image and execute a node installation service. The device can receive, from the node installation service, a request for information associated with a node type. The device can provide the information associated with the node type to the node, causing the node to generate configuration data relating to the node type. The device can receive, from the node, a request for a full operating system image, which can be provided to the node and can support one or more capabilities included in the configuration data.

20 Claims, 6 Drawing Sheets

(56) References Cited

U.S. PATENT DOCUMENTS

2012/0005321 A1  1/2012  Hu
2013/0125107 A1  5/2013  Bandakka
2015/0178096 A1  6/2015  Inbaraj
2015/0317169 A1  11/2015 Sinha
2016/0188313 A1  6/2016  Dubal
2017/0149931 A1  5/2017  Lochhead

* cited by examiner

AUTOMATIC BOOTSTRAPPING AND DYNAMIC CONFIGURATION OF DATA CENTER NODES

RELATED APPLICATION

This application is a continuation of U.S. patent application Ser. No. 15/462,173, filed Mar. 17, 2017, the content of which is incorporated herein by reference.

BACKGROUND

Bootstrapping can refer to loading an operating system into memory to provide an environment within which programs can operate. For example, a server device can utilize dynamic host configuration protocol (DHCP) or Bootstrap protocol (BOOTP) to assign internet protocol (IP) addresses to a group of servers connected to a network, and can bootstrap the group of servers by providing the group of servers with an operating system.

DETAILED DESCRIPTION OF PREFERRED EMBODIMENTS

The following detailed description of example implementations refers to the accompanying drawings. The same reference numbers in different drawings can identify the same or similar elements.

Data centers can include hundreds, often thousands, of nodes (e.g., server devices) that support a wide variety of programs and services. When a new data center is created, the nodes need to be bootstrapped with an operating system to be able to support the wide variety of programs and services. In some cases, the nodes can be bootstrapped manually by having a network administrator load an operating system on each node in the data center. This can cause the process of bootstrapping the nodes in the data center to take weeks, often months, to complete.

Implementations described herein provide for a management node to automatically bootstrap nodes by utilizing a framework of metadata that allows the management node to bootstrap particular nodes with particular capabilities. For example, the management node can provide pre-boot execution environment (PXE) instructions to nodes in a data center, and the PXE instructions can cause the data center nodes to load a minimal operating system image into random access memory (RAM), and can cause the data center nodes to use the minimal operating system to execute a node installation service. The node installation service can obtain information associated with a particular node type, and can generate configuration data associated with the particular node type. In this case, the data center nodes can request a full operating system image that can support the configuration data associated with the particular node type. The data center nodes can complete the bootstrapping process by loading the full operating system image into RAM, which can allow the data center nodes to support one or more capabilities associated with the particular node type.

In this way, the management node is able to automatically bootstrap a data center with hundreds, often thousands, of nodes, in a time-efficient manner (e.g., fewer than three hours, fewer than five hours, fewer than eight hours, etc.), which saves power and computing resources. Additionally, the management node is able to provide high reliability by persisting data via a metadata framework. Furthermore, by loading the minimal operating system image into RAM (e.g., instead of onto disk), and executing the minimal operating system on RAM (e.g., instead of on disk), the management node conserves power and computing resources relative to loading the minimal operating system image onto disk and relative to executing the minimal operating system image on disk.

Figure 1A:
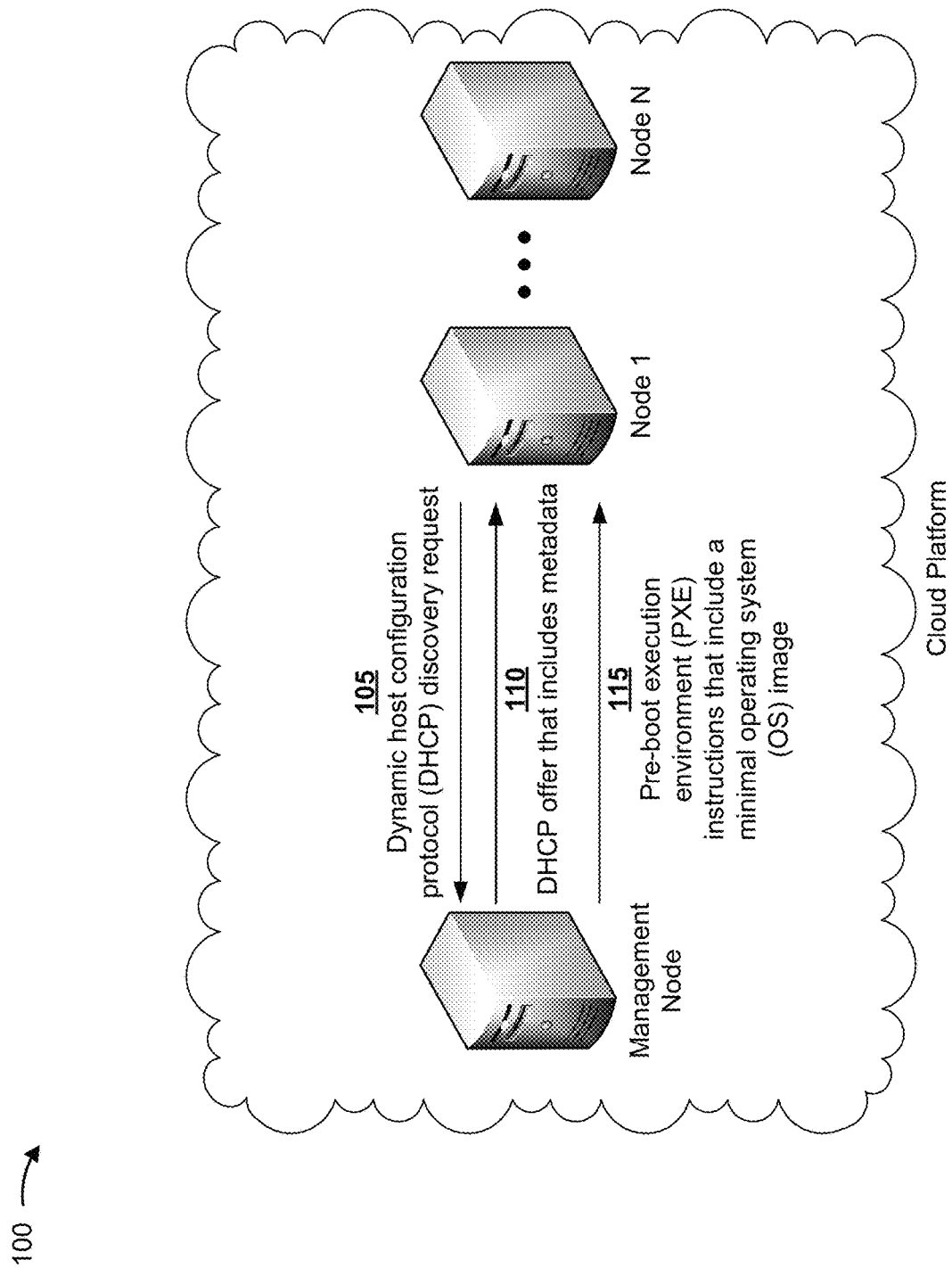
FIGS. 1A-1C are diagrams of an overview of an example implementation described herein.
Figure 1B:
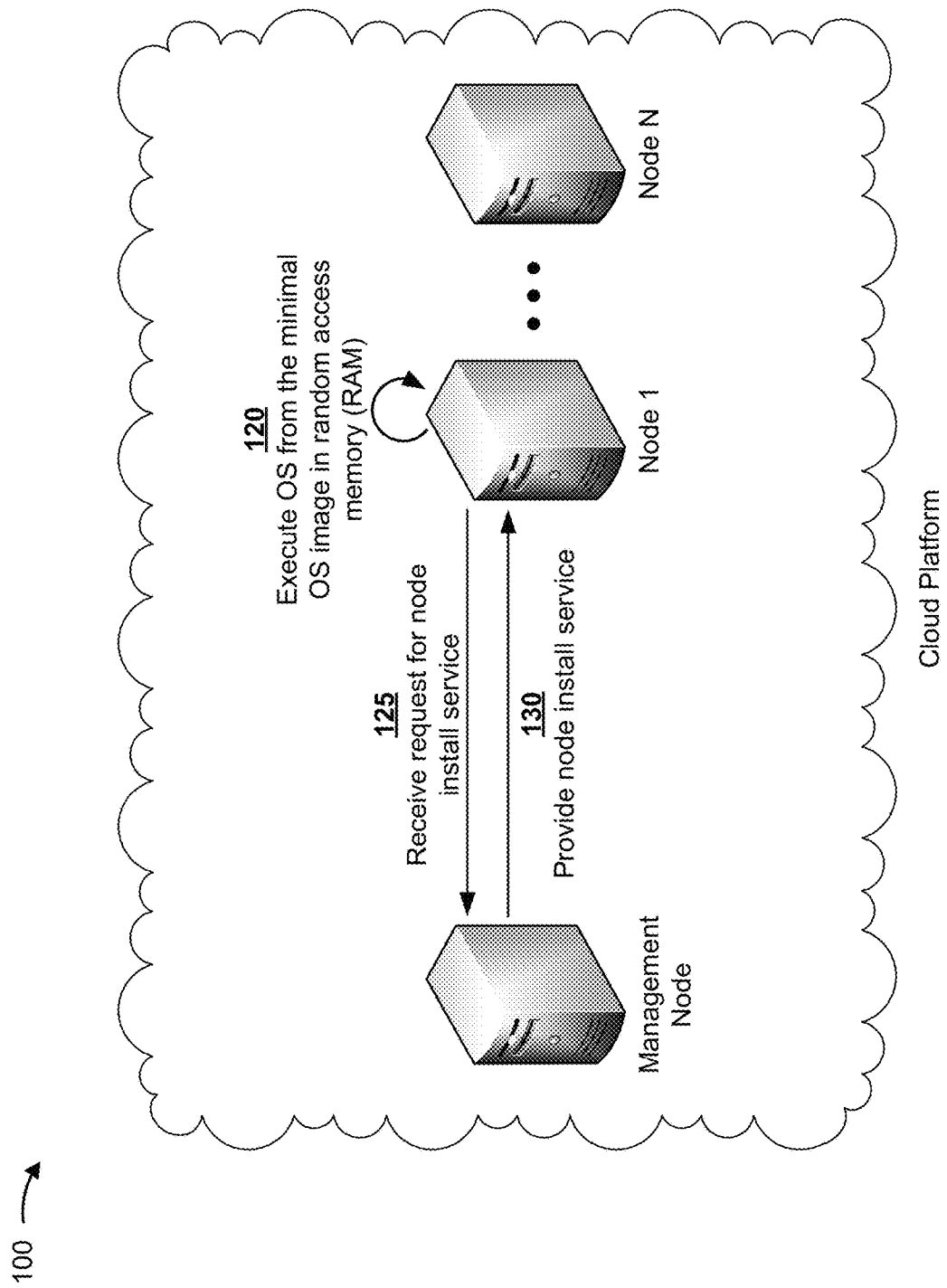
Figure 1C:
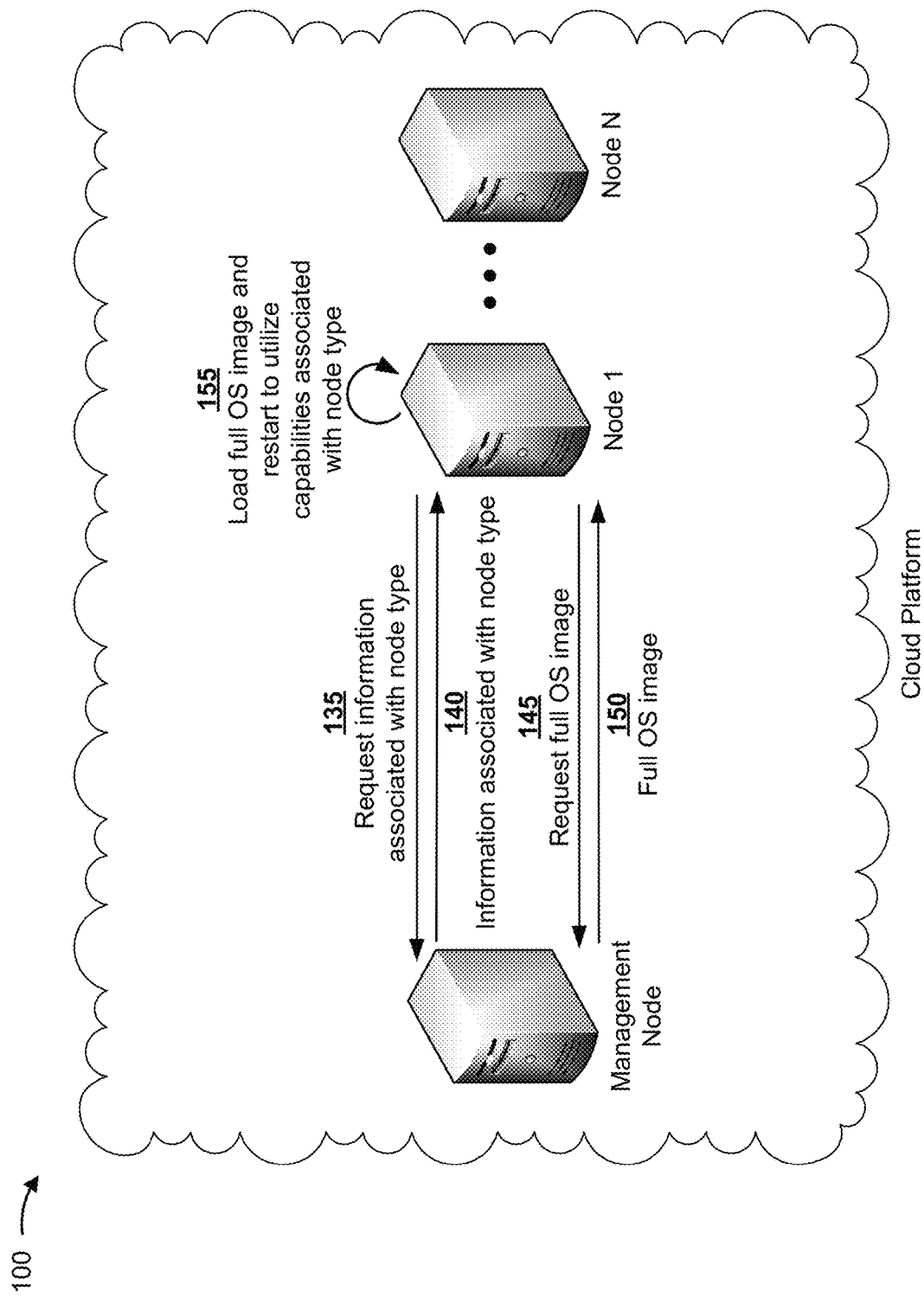

FIGS. 1A-1C are diagrams of an overview of an example implementation 100 described herein. For FIGS. 1A-1C, assume a management node communicates with a set of nodes (e.g., shown as node 1 through node N) to bootstrap the set of nodes with operating systems. Further assume that the management node is provisioned with a PXE service, a metadata service, a web service (e.g., Apache), an enterprise registry service, or the like, and that the management node executes the metadata service to generate a data structure that includes metadata associated with the set of nodes. The metadata can include node identification information, such as an internet protocol (IP) address, a media access control (MAC) address, a rack number, a slot number, a node type (e.g., a management node type, a control node type, a computing node type, a storage node type, etc.), a storage type (e.g., a solid-state drive (SSD), a hard disk drive (HDD), etc.), a geographic location identifier, and/or the like.

As shown in FIG. 1A, and by reference number 105, the management node can receive, from a node (e.g., node 1) of the set of nodes, a dynamic host configuration protocol (DHCP) request. For example, the node can be powered on, and can be configured to automatically select a PXE boot setting from a boot priority, and the PXE boot setting can execute to trigger the node to transmit a DHCP discovery request to the management node. As shown by reference number 110, the management node can provide, to the node, a DHCP offer that includes metadata associated with the node. For example, the management node can provide an IP address and/or a MAC address based on the metadata included in the data structure.

As shown by reference number 115, the management node can provide, to the node, PXE instructions that include a minimal operating system image. For example, the PXE instructions can include an operating system image, and the management node can provide the minimal operating system image to the node. The minimal operating system image can include a minimal operating system, including, for example, basic operating system maintenance tools, minimum user space tools, a packages repository, and/or the like. The node can load the minimal operating system image into RAM.

As shown in FIG. 1B, and by reference number 120, the PXE instructions can trigger the node to execute the minimal operating system from the minimal operating system image in RAM. As shown by reference number 125, the management node can receive, from the node, a request for a node installation service. For example, the node can execute the minimal operating system to transmit the request for the node installation service. In some cases, the node installation service can generate configuration data that can be used to bootstrap the node, as described further herein. As shown by reference number 130, the management node can provide the node installation service to the node. By utilizing the PXE instructions to trigger the node to execute a minimal operating system from a minimal operating system image in RAM, the management node conserves memory resources relative to a bootstrapping process that causes a node to execute a full operating system in RAM and/or conserves power and computing resources relative to a bootstrapping process that executes a minimal operating system from a minimal operating system image on disk.

As shown in FIG. 1C, and by reference number 135, the management node can receive, from the node, a request for information associated with a node type. For example, the node can execute the node installation service, and the node installation service can communicate with the metadata service of the management node to request the information associated with the node type. As shown by reference number 140, the management node can provide the information associated with the node type to the node. In this case, the node installation service can process the information associated with the node type to generate configuration data specific to the node type. The configuration data can be capable of executing on a full operating system.

As shown by reference number 145, the management node can receive, from the node, a request for a full operating system image. As shown by reference number 150, the management node can provide, to the node, the full operating system image. For example, the management node can provide the full operating system image to provide the node with one or more capabilities associated with the node type. As shown by reference number 155, the node can load the full operating system image into RAM and perform a system restart to utilize the one or more capabilities associated with the node type. The system restart can allow the node to execute the full operating system from the full operating system image, and the full operating system can execute with the configuration data, thereby providing the one or more capabilities associated with the node type.

By automatically bootstrapping the node with a full operating system that can support one or more capabilities associated with the node type, and repeating the bootstrapping process for all (or some) nodes in the set of nodes, the management node is able to generate a fully operational set of nodes that are equipped to provide cloud services. In some implementations, the management node can bootstrap multiple nodes, in the set of nodes, at the same time, thereby reducing a total amount of time needed to bootstrap the set of nodes.

As indicated above, FIGS. 1A-1C are provided merely as an example. Other examples are possible and can differ from what was described with regard to FIGS. 1A-1C. For example, while FIGS. 1A-1C describe a management node bootstrapping an individual node, other implementations provide for a management node to automatically bootstrap hundreds, or even thousands, of nodes, concurrently.

Figure 2:
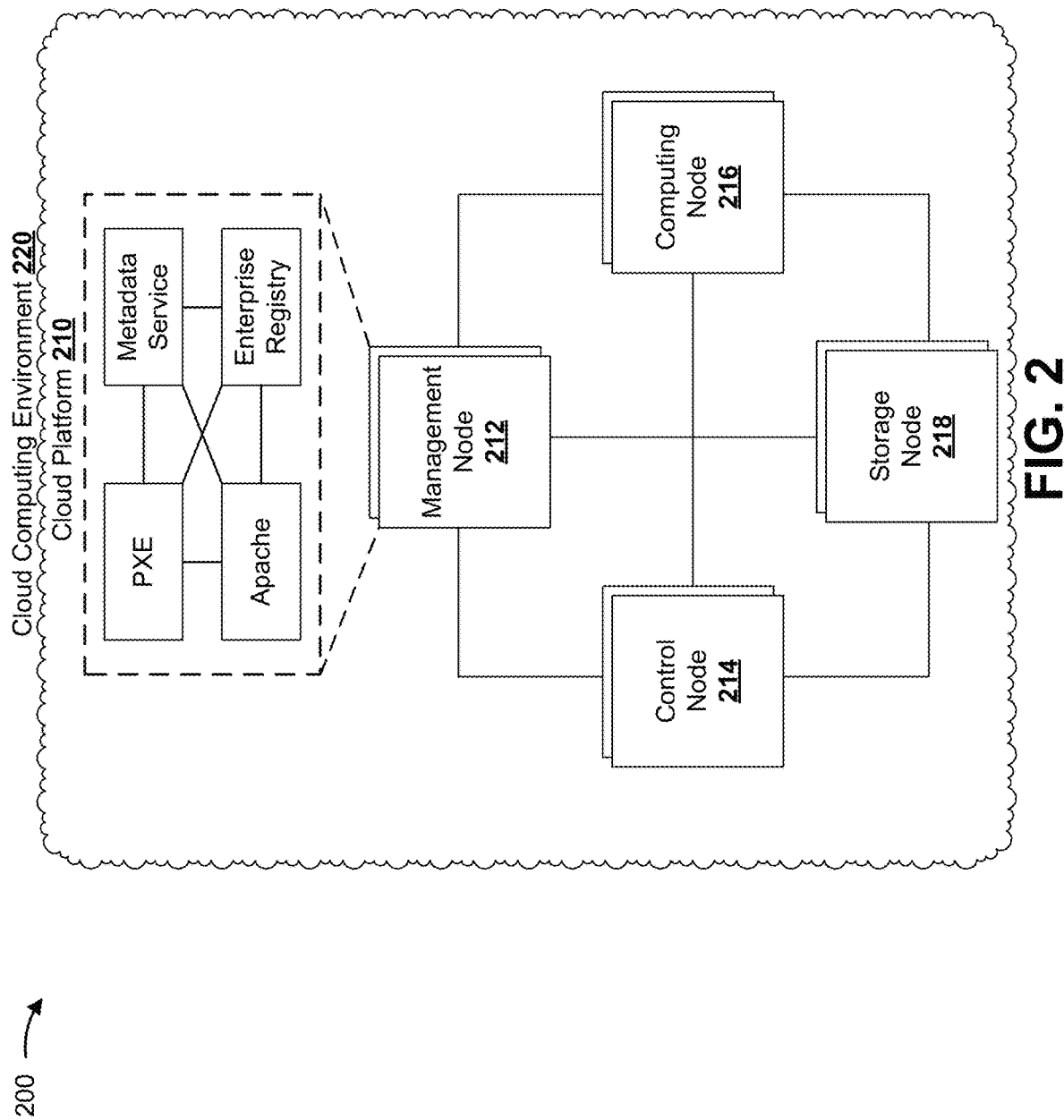
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include cloud platform 210 hosted within cloud computing environment 220. Cloud platform 210 can include management node 212, control node 214, computing node 216, and/or storage node 218. Devices of environment 200 can interconnect via wired connections, wireless connections, or a combination of wired and wireless connections.

Cloud platform 210 includes one or more computing devices capable of receiving, configuring, generating, modifying, and/or providing information associated with bootstrapping a node. Bootstrapping an operating system can refer to using an operating system to bootstrap a node (e.g., a computing device). For example, cloud platform 210 can include one or more computing devices that, when bootstrapped, can serve as a cloud server or a group of cloud servers to provide cloud services. In some implementations, cloud platform 210 can be implemented as or replaced with a data center.

In some implementations, as shown, cloud platform 210 can be hosted in cloud computing environment 220. Notably, while implementations described herein describe cloud platform 210 as being hosted in cloud computing environment 220, in some implementations, cloud platform 210 can be based outside of a cloud (i.e., can be implemented outside of a cloud computing environment) or can be partially cloud-based.

Cloud computing environment 220 includes an environment that hosts cloud platform 210. Cloud computing environment 220 can provide computation, software, data access, storage, and/or other services that do not require end-user knowledge of a physical location and configuration of system(s) and/or device(s) that host cloud platform 210. As shown, cloud computing environment 220 can include a group of nodes, such as management node 212, control node 214, computing node 216, and/or storage node 218. As further shown, management node 212 can include or implement a PXE, a metadata service, a web service (e.g., Apache), an enterprise registry, or the like.

While implementations described herein can associate particular functionality with particular nodes, any one of the nodes associated with cloud computing environment 220 can perform any or all of the functionality described herein. Additionally, a single one of these nodes can, in some implementations, be implemented by multiple nodes. Further, a single one of these nodes can be implemented on a single computing device or can be implemented on multiple computing devices. A node is implemented in hardware, firmware, or a combination of hardware and software.

Management node 212 includes one or more devices capable of storing, configuring, managing, modifying, and/or providing information associated with bootstrapping an operating system. In some implementations, management node 212 can communicate with a set of nodes (e.g., control node 214, computing node 216, and/or storage node 218, etc.) to perform tasks relating to configuring and/or bootstrapping a node. For example, management node 212 can serve as a DHCP server, and can communicate with the set of nodes to receive DHCP discovery requests and provide DHCP offers. In some implementations, management node 212 can configure and/or bootstrap a node to join an existing set of nodes. Additionally, or alternatively, management node 212 can remove a node from the set of nodes. Additionally, or alternatively, management node 212 can detect a condition associated with a health status of a node, and can reconfigure and re-bootstrap the node.

As further shown in FIG. 2, management node 212 includes cloud resources, such as a PXE, a metadata service, a web service (e.g., Apache), an enterprise registry, or the like. In some implementations, the cloud resources can communicate with other cloud resources via wired connections, wireless connections, or a combination of wired and wireless connections. In some implementations, one or more of the cloud resources can be implemented on bare-metal hardware. In some implementations, one or more of the cloud resources can be implemented as virtual resources on shared hardware.

The PXE includes a standardized environment that can load a software assembly to PXE-enabled nodes. For example, PXE can include a DHCP, a BOOTP, a minimal operating system image, or the like. In some implementations, the PXE can provide, to the set of nodes, PXE instructions that include the minimal operating system image.

The metadata service includes one or more instructions capable of configuring metadata and/or providing an application programming interface (API) to access the metadata. For example, the metadata service can provide metadata to the set of nodes that includes a media access control (MAC) address, a rack number, a slot number, a storage type, a geographic location identifier, and/or any other information that can be used to identify a node. In some implementations, the metadata service can communicate with the web service (e.g., Apache) to request and receive information associated with a node type for the set of nodes.

The web service includes one or more services capable of hosting and providing a node installation service and/or a full operating system image. In some implementations, a full operating system image can support configuration data that is generated by the node installation service, as described further herein.

The enterprise registry service includes one or more storage systems and/or one or more devices that use virtualization techniques within the storage systems or devices of management node 212. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations. In some implementations, the enterprise registry can provide software packages necessary to bootstrap the set of nodes. In some implementations, the enterprise registry can be hosted by another node, such as storage node 218. In some implementations, the enterprise registry can be hosted outside of cloud platform 210, and can be accessible by the set of nodes included in cloud platform 210.

Control node 214 includes one or more devices capable of providing basic operational software needed to form a set of nodes and/or manage a set of nodes. For example, control node 214 can provide basic operational software used to form a set of nodes and/or manage a set of nodes that include management node 212, control node 214, computing node 216, and/or storage node 218.

Computing node 216 includes one or more devices capable of receiving, storing, configuring, generating, and/or providing information associated with bootstrapping an operating system. In some implementations, computing node 216 can include multiple computing nodes (referred to as "computing nodes 216"). Additionally, or alternatively, computing node 216 can communicate with one or more cloud resources of management node 212.

Storage node 218 includes one or more devices capable of receiving, storing, and/or providing information associated with bootstrapping an operating system. In some implementations, storage node 218 can host the enterprise registry. Additionally, or alternatively, storage node 218 can provide distributed block storage and/or distributed object storage to the set of nodes in cloud platform 210.

In some implementations, the set of nodes within cloud platform 210 can be partitioned into groups based on metadata. For example, the set of nodes can be partitioned logically to provide any number of functions and/or services. In some cases, as indicated above, the set of nodes can be partitioned based on node type (e.g., management node 212, control node 214, computing node 216, and/or storage node 218). In other cases, the set of nodes can be partitioned into sub-types. For example, storage node 218 can be partitioned into a block storage node and an object storage node.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
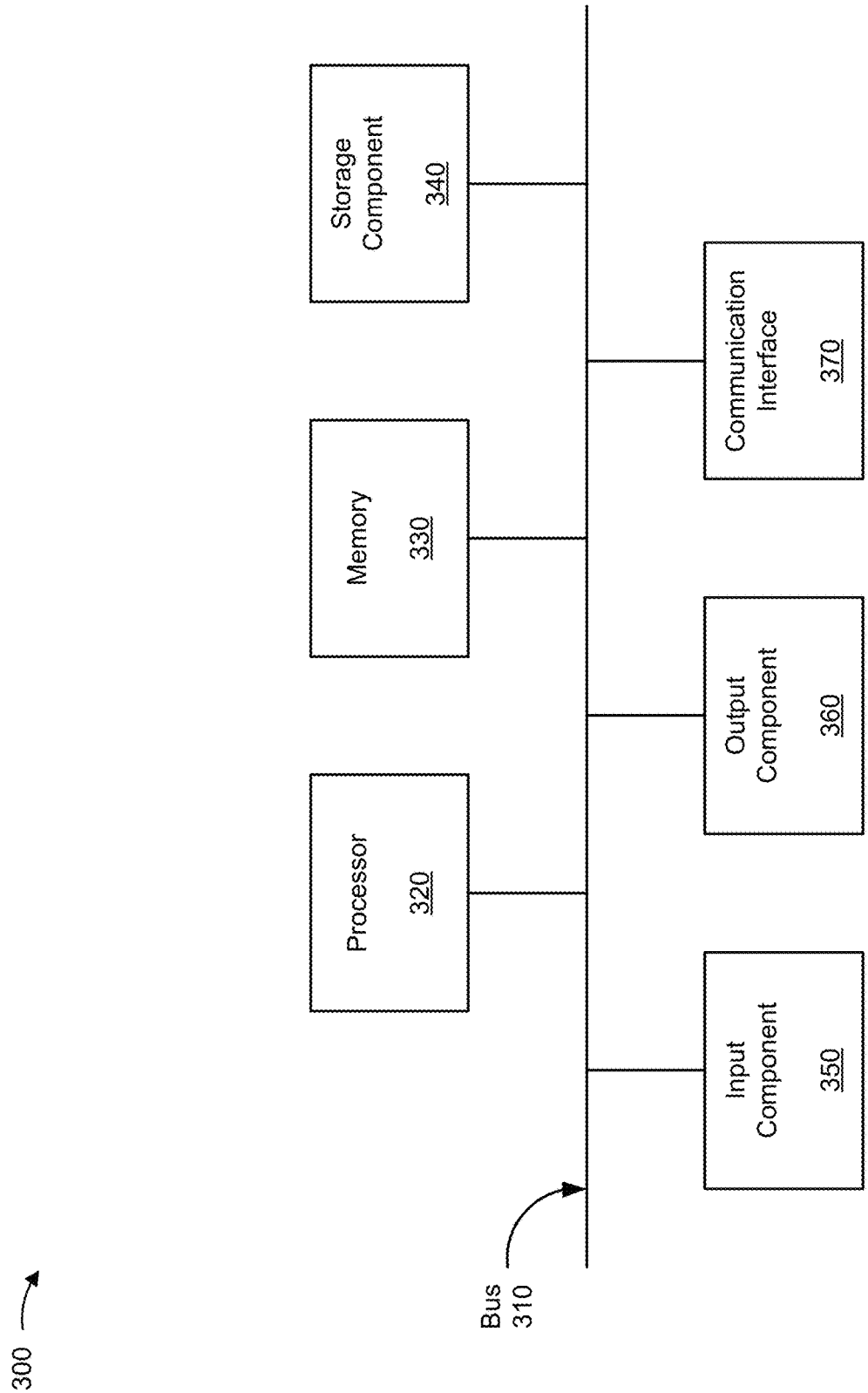
FIG. 3 is a diagram of example components of one or more devices of FIG. 2.

FIG. 3 is a diagram of example components of a device 300. Device 300 can correspond to one or more nodes of cloud platform 210, such as management node 212, control node 214, computing node 216, storage node 218, or the like. In some implementations, one or more nodes of cloud platform 210, such as management node 212, control node 214, computing node 216, storage node 218, or the like, can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a RAM, a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
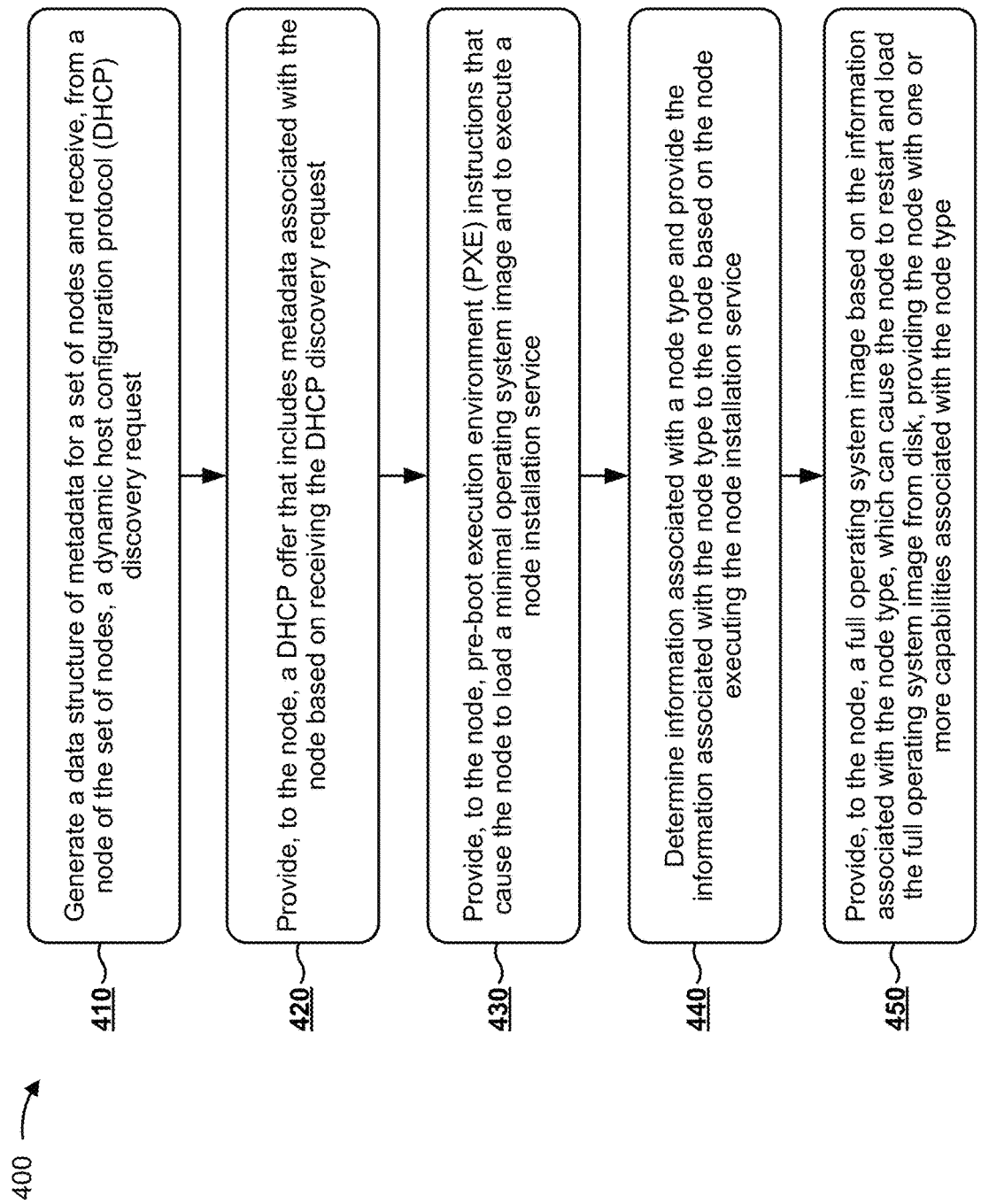
FIG. 4 is a flow chart of an example process for automatically bootstrapping and configuring a set of nodes based on a metadata framework.

FIG. 4 is a flow chart of an example process 400 for automatically bootstrapping and configuring a set of nodes based on a metadata framework. In some implementations, one or more process blocks of FIG. 4 can be performed by management node 212. In some implementations, one or more process blocks of FIG. 4 can be performed by another device or a group of devices separate from or including management node 212, such as cloud platform 210, control node 214, computing node 216, and storage node 218.

As shown in FIG. 4, process 400 can include generating a data structure of metadata for a set of nodes and receiving, from a node of the set of nodes, a dynamic host configuration protocol (DHCP) discovery request (block 410). For example, management node 212 can be configured in a manner that allows management node 212 to generate a data structure of metadata for a set of nodes (e.g., a set of servers in a data center). In some implementations, management node 212 can receive, from a node of the set of nodes, a DHCP discovery request as part of a PXE boot process.

In some implementations, management node 212 can be provisioned with configuration information associated with a network. For example, a systems administrator can load a minimal operating system image onto management node 212 (e.g., via an archive file of an optical disk, such as an ISO file). In this case, the minimal operating system image can be loaded into RAM and can provide access to configuration information, such as a network interface name, a private IP subnet for the network, an IP address for management node 212, a network time protocol (NTP), or the like. Furthermore, after the configuration information has been obtained, management node 212 can load a full operating system image onto disk, can perform a system restart, and can execute the full operating system from the full operating system image on disk.

In some implementations, management node 212 can execute one or more installation scripts that allow management node 212 to access applications that can be used to generate the data structure of metadata. For example, management node 212 can execute one or more installation scripts to obtain (e.g., download) applications, such as applications associated with a PXE service, a metadata service, a web service (e.g., Apache), an enterprise registry service, or the like. In some cases, management node 212 can execute the one or more installation scripts after executing the full operating system.

In some implementations, management node 212 can generate a data structure of metadata based on the metadata service. For example, management node 212 can obtain a metadata service, and can provide metadata associated with the set of nodes to the metadata service. The metadata associated with the set of nodes can include node identification information, and can include at least one of a MAC address, a rack number, a slot number, a node type, a storage type (e.g., a solid-state drive (SSD), a hard disk drive (HDD), etc.), a geographic location identifier, and/or the like.

In some implementations, such as after management node 212 generates the data structure of metadata, a node, of the set of nodes, can power on and execute a PXE boot. For example, the node can power on and load a basic input-output system (BIOS) screen that includes one or more boot priorities, and can automatically select a PXE boot priority. In this case, the first step in the PXE boot can be to send a DHCP discovery request to management node 212. The DHCP discovery request can be a request for a MAC address, an IP address, or the like. In some implementations, management node 212 can receive a DHCP discovery request from all (or some) nodes associated with cloud platform 210.

As further shown in FIG. 4, process 400 can include providing, to the node, a DHCP offer that includes metadata associated with the node based on receiving the DHCP discovery request (block 420). For example, management node 212 can provide (e.g., transmit) a DHCP offer that includes metadata associated with the node based on accessing the data structure of metadata.

In some implementations, management node 212 can provide a DHCP offer that includes an IP address or a MAC address that is being offered to the node. For example, management node 212 can obtain, from the data structure of metadata, information indicating a rack number and a slot number of the node. In this case, management node 212 can assign an IP address or a MAC address to the node based on the information indicating the rack number and the slot number of the node.

In some implementations, management node 212 can provide a node with a MAC address, a rack number, and a slot number, and can provide a corresponding backup node with another MAC address, another rack number, and/or another slot number, where the backup node is associated with a particular type of hardware (e.g., a switch, a power supply, a rack, a cooling system, etc.) or a geographic location that is different than the particular type of hardware or geographic location associated with the node. For example, the backup node can be associated with a switch or a power supply that is different than a switch or a power supply used by the node. In this case, if the switch or the power supply associated with the node fails, data persists due to management node 212 utilizing metadata to provide the backup node with the other MAC address, the other rack number, and/or the other slot number associated with the switch or the power supply that is different than the switch or the power supply used by the node.

As further shown in FIG. 4, process 400 can include providing, to the node, pre-boot execution environment (PXE) instructions that cause the node to load a minimal operating system image and to execute a node installation service (block 430). For example, management node 212 can provide (e.g., transmit) PXE instructions that cause the node to load a minimal operating system image into RAM, and the node can execute the minimal operating system, from the minimal operating system image, to execute a node installation service. In this case, the PXE instructions can include a minimal operating system image, and the minimal operating system image can include basic operating system maintenance tools, minimum user space tools, a packages repository, or the like. The minimal operating system can support services that can be used to bootstrap the node, such as the node installation service. The node installation service can include one or more instructions capable of generating configuration data associated with a node type, as described further herein.

In some implementations, management node 212 can provide PXE instructions to the node which can cause the node to load a minimal operating system image. For example, the node can receive PXE instructions that include the minimal operating system image, and the node can load the minimal operating system image into RAM. In this case, the node can execute the minimal operating system from the minimal operating system image in RAM. The minimal operating system can include an Init process that allows the node to utilize a web service (e.g., Apache) to obtain access to one or more services that can be used to bootstrap the node (e.g., a node installation service). By executing a minimal operating system from a minimal operating system image in RAM, management node 212 conserves memory resources relative to executing a full operating system image in RAM and/or conserves power and computing resources relative to executing a minimal operating system image on disk.

In some implementations, the minimal operating system can allow the node to obtain, load, and execute a node installation service. For example, the node can communicate with the web service of management node 212 to obtain the node installation service, and can load (e.g., install) the node installation service. In this case, the node can execute the node installation service to obtain information associated with a node type.

As further shown in FIG. 4, process 400 can include determining information associated with a node type and providing the information associated with the node type to the node based on the node executing the node installation service (block 440). For example, the metadata service of management node 212 can receive, from the node installation service of the node, a request for information associated with the node type. This can cause the metadata service to determine the information associated with the node type and to provide the information associated with the node type to the node. The information associated with the node type can include one or more software packages and/or binaries that perform one or more capabilities associated with the node type.

In some implementations, management node 212 can determine information associated with a node type based on querying a data structure that is different than the data structure of metadata, such as the enterprise registry. For example, management node 212 can receive a request for information associated with the node type, and the request can include an IP address, a MAC address, and/or a node type associated with the node, and management node 212 can use the information included in the request to query the enterprise registry. In this case, management node 212 can query the enterprise registry to compare the information included in the request and the stored information (e.g., stored by the enterprise registry). Based on the query, management node 212 can obtain information associated with the node type (e.g., one or more software packages, one or more binaries, etc.). By determining and providing information associated with a node type, management node 212 provides the node with information that can be used to complete the bootstrap process.

In some implementations, the node installation service can generate configuration data based on the information associated with the node type. For example, the node installation service can generate node configuration information that provides the node with capabilities that are specific to the node type. In some cases, the configuration data can be capable of executing on a full operating system image, and the node can send a request to management node 212 for a full operating system image.

As further shown in FIG. 4, process 400 can include providing, to the node, a full operating system image based on the information associated with the node type, which can cause the node to restart and execute a full operating system from the full operating system image on disk, providing the node with one or more capabilities associated with the node type (block 450). For example, management node 212 can provide, to the node, a full operating system image, and the node can include the configuration data when loading the full operating system image onto disk, which can allow the full operating system to provide one or more capabilities associated with the node type. A full operating system image can include driver information, BIOS information, software packages, and binaries associated with the node type, and/or the like.

In some implementations, management node 212 can provide the full operating system image to the node, which can trigger the node to load the full operating system image onto disk. For example, the node can load the full operating system image onto disk in a manner that includes the configuration data associated with the node type. Furthermore, the node can perform a system restart, and can execute the full operating system from the full operating system image. In this case, the full operating system can include an Init process that can execute the configuration data. In this way, the node is able to execute ("bootstrap") the full operating system with one or more capabilities associated with the node type.

Additionally, or alternatively, management node 212 can receive a request to bootstrap another node. In this case, management node 212 can add metadata for the other node to the data structure of metadata, and the metadata can indicate a particular node type. Additionally, management node 212 can bootstrap the other node using the process described above to allow the other node to support one or more capabilities associated with the particular node type.

Additionally, or alternatively, management node 212 can detect a condition associated with a health status of a node that has been bootstrapped, and can re-bootstrap the node to improve the health status of the node. For example, management node 212 can detect a condition associated with a health status of a node, and the condition can indicate that the node is not performing or functioning properly. In this case, management node 212 can verify that a backup copy of data associated with the node is available, and can re-bootstrap the node to improve the health status of the node. For example, re-bootstrapping the node can clear the node of data and provide the node with another full operating system image to support the one or more capabilities. In some cases, a backup node can support traffic while the node is being re-bootstrapped. In this way, management node 212 provides persistent data by automatically re-bootstrapping nodes that are not performing or functioning properly.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, management node 212 is able to automatically bootstrap hundreds, often thousands, of nodes, in a time-efficient manner, thereby conserving power and computing resources. Additionally, management node 212 is able to provide high reliability by persisting data via a metadata framework. Furthermore, by loading a minimal operating system image into RAM (e.g., instead of onto disk), and executing a minimal operating system from the minimal operating system image in RAM (e.g., instead of on disk), management node 212 conserves power and computing resources relative to loading the minimal operating system image onto disk and relative to executing the minimal operating system image on disk.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
generate a data structure of metadata for a set of nodes;
receive, from a node of the set of nodes, a dynamic host configuration protocol (DHCP) discovery request;
provide, to the node and based on receiving the DHCP discovery request, a DHCP offer that includes metadata associated with the node;
provide, to the node, pre-boot execution environment (PXE) instructions that include a minimal operating system image, to cause the node to load the minimal operating system image and execute a node installation service;
determine information associated with a node type associated with node functionality;
where the node installation service obtains the information associated with the node type and generates configuration data associated with the node type;
provide the information associated with the node type to the node;
receive, from the node, a request for a full operating system image;
provide, to the node, the full operating system image based on the information associated with the node type, the full operating system image including a full operating system to execute the configuration data to provide one or more capabilities associated with the node type;
  detect a health status of the node; and
  when the node is not functioning properly, re-bootstrap the node to clear the node of data and provide the node with another operating system to support a second node type and second node functionality that are different from the node type and the node functionality.

2. The device of claim 1, where the one or more processors, when generating the data structure of metadata, are to:
  obtain a metadata service,
  provide metadata associated with the set of nodes to the metadata service,
    the metadata associated with the set of nodes to include at least one of:
      a media access control (MAC) address,
      a rack number,
      a slot number, or
      a storage type, and
  generate the data structure of metadata based on providing the metadata associated with the set of nodes.

3. The device of claim 1, where the one or more processors, when providing the DHCP offer, are to:
  obtain, from the data structure of metadata, information indicating a rack number and a slot number of the node,
  determine an internet protocol (IP) address based on the information indicating the rack number and the slot number of the node, and
  provide the DHCP offer that includes the metadata associated with the node,
    the metadata including the IP address, the rack number, and the slot number.

4. The device of claim 1, where providing the full operating system image causes the node to load the full operating system image onto disk, perform a system restart, and execute a full operating system from the full operating system image on the disk to provide the node with one or more capabilities associated with the node type.

5. The device of claim 1, where the one or more processors, when providing the PXE instructions, are to:
  provide the PXE instructions,
    the PXE instructions to include the minimal operating system image,
    the PXE instructions to cause the node to load the minimal operating system image, and
    the PXE instructions to cause the node to execute a minimal operating system from the minimal operating system image,
      the node to obtain and execute a node installation service based on executing the minimal operating system.

6. The device of claim 1, where the one or more processors, when determining the information associated with the node type, are to:
  receive, from the node, a request for information associated with the node type,
  compare information included in the request and stored information, and
  determine the information associated with the node type based on comparing the information included in the request and the stored information.

7. A non-transitory computer-readable medium storing instructions, the instructions comprising:
  one or more instructions that, when executed by one or more processors, cause the one or more processors to:
    receive, from a node of a set of nodes, a dynamic host configuration protocol (DHCP) discovery request;
    provide, to the node, based on receiving the DHCP discovery request, a DHCP offer that includes metadata associated with the node;
    provide, to the node, pre-boot execution environment (PXE) instructions that include a minimal operating system image, to cause the node to load the minimal operating system image into RAM and to cause the node to execute a node installation service;
    receive, from the node installation service, a request for information associated with a node type associated with node functionality;
    provide, based on receiving the request, the information associated with the node type to the node installation service,
      the information associated with the node type to cause the node installation service to generate configuration data relating to the node type and node functionality;
    receive, from the node, a request for a full operating system image;
    provide, to the node, the full operating system image, a full operating system, corresponding to the full operating system image, to execute the configuration data to provide the node functionality associated with the node type;
    detect a health status of the node; and
    when the node is not functioning properly, re-bootstrap the node to clear the node of data and provide the node with another operating system to support a second node type and second node functionality that are different from the node type and the node functionality.

8. The non-transitory computer-readable medium of claim 7, where the one or more instructions, that cause the one or more processors to provide the DHCP offer, cause the one or more processors to:
  obtain, from a data structure of metadata, metadata relating to the node,
  determine an internet protocol (IP) address based on the metadata relating to the node, and
  provide the DHCP offer that includes the IP address.

9. The non-transitory computer-readable medium of claim 7, where providing the full operating system image causes the node to load the full operating system image onto disk to provide the node with one or more capabilities associated with the node type.

10. The non-transitory computer-readable medium of claim 7, where the one or more instructions, that cause the one or more processors to provide the PXE instructions, cause the one or more processors to:
  provide the PXE instructions,
    the PXE instructions to include the minimal operating system image, and
    the PXE instructions to cause the node to load the minimal operating system image into RAM and to cause the node to obtain and execute the node installation service.

11. The non-transitory computer-readable medium of claim 7, where the node functionality includes functionality of at least one of:
  a management node,
  a control node,
  a computing node, or a storage node, and
where the one or more instructions, that cause the one or more processors to provide the information associated with the node functionality, cause the one or more processors to:
provide, to the node installation service, information associated with the management node functionality, the control node functionality, the computing node functionality, or the storage node functionality.

12. The non-transitory computer-readable medium of claim 7, where the one or more instructions, when executed by the one or more processors, further cause the one or more processors to:
receive a request to bootstrap another node;
add metadata for the other node to a data structure of metadata,
the metadata indicating a particular node type; and
bootstrap the other node to allow the other node to support one or more capabilities associated with the particular node type.

13. The non-transitory computer-readable medium of claim 7, where the one or more processors execute one or more instructions to automatically and concurrently bootstrap the set of nodes.

14. A method, comprising:
receiving, by a device and from a node of a set of nodes, a dynamic host configuration protocol (DHCP) discovery request;
determining, by the device, a DHCP offer based on metadata associated with the node;
transmitting, by the device and to the node, the DHCP offer that includes the metadata associated with the node and pre-boot execution environment (PXE) instructions,
the PXE instructions to cause the node to load a minimal operating system image and to cause the node to execute a node installation service;
receiving, by the device and from the node installation service, a request for information associated with a node type associated with node functionality;
providing, by the device and to the node installation service, the information associated with the node type based on receiving the request,
the information associated with the node type to cause the node installation service to generate configuration data relating to the node type;
receiving, by the device and from the node, a request for a full operating system image;
providing, by the device and to the node, the full operating system image, the full operating system image including a full operating system to execute the configuration data to provide one or more capabilities associated with the node type and the node functionality;
detecting, by the device, a health status of the node; and
when the node is not functioning properly, re-bootstrapping, by the device, the node to clear the node of data and provide the node with another operating system to support a second node type and second node functionality that are different from the node type and the node functionality.

15. The method of claim 14, further comprising:
obtaining a metadata service,
providing metadata associated with the set of nodes to the metadata service, and
executing the metadata service to form a data structure of metadata based on providing the metadata associated with the set of nodes.

16. The method of claim 14, where determining the DHCP offer comprises:
obtaining metadata relating to the node, and
determining a media access control (MAC) address based on the metadata relating to the node, and
where transmitting the DHCP offer comprises:
transmitting the DHCP offer that includes the MAC address.

17. The method of claim 14, where the PXE instructions cause the node to load the minimal operating system image into random access memory.

18. The method of claim 14, where providing the full operating system image causes the node to load the full operating system image onto disk and execute a full operating system from the full operating system image on the disk to provide the node with one or more capabilities associated with the node type and node functionality.

19. The method of claim 16, wherein the MAC address is determined based on at least one of a rack number or a slot number of the node.

20. The method of claim 16, further comprising:
verifying, prior to re-bootstrapping the node, that a backup copy of data associated with the node is available.

* * * * *